3,071,591
HALOGENATED GLYCOLURILS
Laurene O. Paterson, 1219 E. Church St., Adrian, Mich.
No Drawing. Filed Jan. 4, 1960, Ser. No. 31
13 Claims. (Cl. 260—309.7)

This invention relates to new compounds of glycoluril and their methods of manufacture. More particularly, this invention pertains to N-halogenated glycolurils containing both bromine and chlorine as active components.

This application is a continuation-in-part of my copending application Serial No. 593,047, filed January 22, 1956, in turn a continuation-in-part of Serial No. 438,633 filed June 27, 1954, and now Patent No. 2,779,764 issued January 20, 1957.

The N-halogenated glycolurils belong to a class of compounds wherein halogen atoms are loosely held by nitrogen atoms, such halogen atoms being readily available for chemical reaction. The N-halogenated glycolurils of the present invention contain at least one N-bromo- radical and one N-chloro- radical, but may contain up to a total of 4 halogen atoms. These N-halogenated glycolurils may be dried to provide highly efficient halogen donors which give both active chlorine and active bromine.

The compounds of this invention are especially useful as valuable disinfecting and bleaching agents, since the inclusion of the bromine allows increased residual activity. In addition, aqueous systems containing compounds of the instant invention function as organic oxidants, the bromine being continuously regenerated by the chlorine to act as the active oxidizing component.

Structurally, glycoluril, also known as acetylene urea, is tetrahydromidazo-(4,5-d) imidazole-2,5 (1H,3H)-dione, having the following formula:

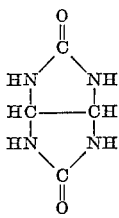

The fused ring system of the glycoluril structure, as shown above, contains four nitrogen atoms, each nitrogen atom having one hydrogen atom bound thereto which may be readily replaced by a halogen atom. The bridgehead carbon atoms of the glycoluril molecule, designated in one system of nomenclature as being in the 3a and 6a positions, may have substituted thereon organic radicals of various kinds. However, for purposes of preparing the N-halogenated glycolurils of this invention it is preferred to use the substituted compounds in which either one or both of the hydrogens on the 3a and 6a carbon atoms have been replaced by an aliphatic or an aromatic group. Thus, the glycolurils used as starting materials in the present invention have the structural formula

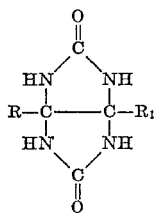

wherein R and $R_1$ each represent hydrogen, an aliphatic group (such as methyl) or an aromatic group (such as phenyl).

Generally, glycoluril will not form particularly stable compounds, the stability usually decreasing where the degree of halogenation is increased. However, the 3a and 6a monoalkyl- and monoaryl-substituted glycolurils show increased stability and the di-substituted compounds form usually stable halogen carriers.

In accordance with the present invention, glycolurils containing varying amounts of bromine and chlorine are provided. These compounds may be prepared by reacting glycolurils with bromine in an aqueous alkaline medium to produce the N-brominated compounds, and then further halogenating by introducing chlorine gas into the reaction medium. When an aliphatic or aromatic radical is substituted for the hydrogen atoms on the 3a and 6a carbon atoms, as many as four halogen atoms may be introduced into the glycoluril molecule, and the tribromo-monochloro, the dibromo-dichloro, or the monobromo-trichloro compounds may be prepared.

Thus the compounds of this invention have the following structural formula

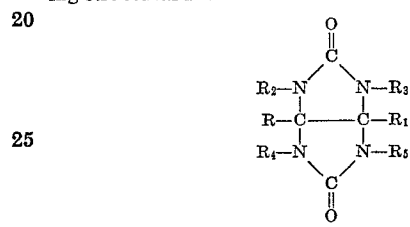

in which R and $R_1$ are selected from the group consisting of hydrogen, an aliphatic and an aromatic radical; $R_2$, $R_3$, $R_4$ and $R_5$ are each selected from the group consisting of hydrogen, bromine and chlorine; and at least one of said $R_2$, $R_3$, $R_4$ and $R_5$ is chlorine and at least another of said $R_2$, $R_3$, $R_4$ and $R_5$ is bromine. It is desirable that R and $R_1$ each be a lower alkyl or phenyl radical.

The manufacture of N-monobromo-N-monochloroglycoluril derivatives may be effected by mixing the glycoluril in water with two equivalents of an alkalizing agent, such as sodium hydroxide, sodium carbonate, or the like, and one equivalent of bromine, and completing the halogenation by introducing at least one mole of chlorine gas into the reaction product. In the foregoing process the bromine reacts initially to substitute for an N-hydrogen atom, and forms a by-product, sodium bromide. When the chlorine is introduced, it first displaces the bromine from the alkali bromide; and after all the released bromine has been taken up by the glycoluril, the chlorine substitutes in the glycoluril molecule. Varying amounts of chlorine and bromine may thus be substituted in the various glycolurils by controlling the amount of alkali and halogen added. Where incomplete saturation of glycoluril is desired, less alkali is used and the addition of chlorine stopped when the pH reaches values ranging from about 5 to 6.

The following examples illustrate some of the compounds of the present invention, and some of their methods of manufacture.

*Example 1*

One hundred seventy grams of 3a,6a-dimethyl-glycoluril were suspended in 8000 milliliters of water containing 40 grams of sodium hydroxide. The temperature of this slurry was lowered to 10° C., and 160 grams of bromine were added slowly with rapid agitation. When the bromine had completely reacted, 400 grams of a 20% NaOH solution were added simultaneously with the introduction of chlorine gas to effect a final pH of 5.2. The resultant product consisted essentially of N,N-dibromo-N-monochloro-3a,6a-dimethyl-glycoluril. After drying, the product was shown by analysis to contain 41% bromine and 10.5% chlorine.

Example 2

Two hundred grams of N,N-dichloro-glycoluril in lump form were placed in a treating tank through which a dilute aqueous solution of sodium bromide was allowed to flow. The N,N-dichloro-glycoluril slowly dissolved, reacting with the sodium bromide to produce in situ N-monobromo-N-monochloro-glycoluril in admixture with N,N-dibromo-glycoluril. Such solution may be further diluted to produce effective levels of both active bromine and chlorine for disinfecting purposes.

Example 3

To a suspension of 294 grams of 3a,6a-diphenyl-glycoluril in 8000 milliliters of water, were added 500 grams of cooled 20% NaOH solution. With rapid agitation, 80 grams of liquid bromine were introduced. When all the bromine had been taken up, the halogenation was completed by the introduction of 177 grams of gaseous chlorine. The resultnat product, N-monobromo-N,N-dichloro-3a,6a-diphenyl-glycoluril, weighed 439 grams, and upon analysis was found to contain 18% bromine and 16.2% chlorine.

Example 4

Chlorine gas was bubbled into a stirred slurry of 170 grams of 3a,6a-dimethyl-glycoluril, 212 grams of sodium carbonate, and 258 grams of a crude bromide salt mixture, containing 62% bromine, in 1000 milliliters of water. Agitation was continued throughout chlorination and when all of the halogen was taken up as determined by the pH in the reaction mixture falling below 7, the chlorination was discontinued. The desired product, N,N-dibromo-N,N-dichloro-3a,6a-dimethyl-glycoluril, was recovered by filtration.

Although the specific examples disclose the manufacture of glycolurils having methyl and phenyl radicals bound to the 3a and 6a carbon atoms, it is understood that considerable variation is possible and N-brominated-N-chlorinated glycolurils containing numerous other combinations of aliphatic and aromatic groups substituted on the 3a and 6a carbon atoms may be prepared, such as diethyl, ethyl methyl, diisopropyl, and the like.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. A halogenated glycoluril having the formula

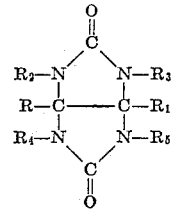

wherein R and $R_1$ are each selected from the group consisting of hydrogen, lower alkyl and monocarbocyclic-aryl; wherein $R_2$, $R_3$, $R_4$ and $R_5$ are each selected from the group consisting of hydrogen, chlorine and bromine; and wherein at least one of said $R_2$, $R_3$, $R_4$ and $R_5$ is chlorine and at least another of said $R_2$, $R_3$, $R_4$ and $R_5$ is bromine.

2. N,N-dibromo - N - monochloro - 3a,6a - dimethyl-glycoluril.
3. N,N - dibromo - N,N - dichloro - 3a,6a - dimethyl-glycoluril.
4. N-bromo-N,N-dichloro-3a,6a-diphenyl-glycoluril.
5. N - tribromo-N-monochloro-3a,6a-substituted glycoluril in which the substituents are lower alkyl.
6. N-monobromo-N-trichloro - 3a,6a - substituted glycoluril in which the substituents are lower alkyl.
7. N-brominated-N-chlorinated-glycoluril.
8. N-monobromo-N-monochloro-glycoluril.
9. N-monobromo-N-monochloro-3a,6a-lower - dialkyl-glycoluril.
10. N - monobromo-N-monochloro - 3a,6a - dihpenyl-glycoluril.
11. N-dibromo-N-dichloro - 3a,6a - lower dialkyl-glycoluril.
12. N,N-dibromo - N - monochloro-3a,6a-lower-dialkyl-glycoluril.
13. NaN - dichloro - N - monobromo-3a,6a-lower-dialkyl-glycoluril.

References Cited in the file of this patent
UNITED STATES PATENTS

| | | |
|---|---|---|
| 2,628,174 | Stokes et al. | Feb. 10, 1953 |
| 2,638,434 | Adkins | May 12, 1953 |
| 2,649,389 | Williams | Aug. 18, 1953 |
| 2,654,763 | Adkins | Oct. 6, 1953 |
| 2,779,764 | Paterson | Jan. 29, 1957 |
| 2,868,787 | Paterson | Jan 13, 1959 |